United States Patent Office 3,171,854
Patented Mar. 2, 1965

3,171,854
PREPARATION OF PHENYL o-HALOBENZOATES
AND CONVERSION THEREOF TO PHENOL
Edward J. McNelis, Media, Pa., assignor to Sun Oil Company, Philadelphia, Pa., a corporation of New Jersey
No Drawing. Filed Apr. 13, 1961, Ser. No. 102,633
12 Claims. (Cl. 260—476)

This invention relates to the preparation of phenyl o-halobenzoate esters by the prolysis of alkali metal o-halobenzoates together with o-halobenzoic acid. The invention further embraces the use of such esters as an intermediate in the preparation of phenol.

In one aspect the invention concerns the preparation of esters useful as chemical intermediates which esters are phenyl o-halobenzoates in which the halogen is either bromine or chlorine. The method of preparation comprises heating an alkali metal o-chlorobenzoate or o-bromobenzoate salt with either o-chlorobenzoic acid or o-bromobenzoic acid. The alkali metal in the salt can be sodium, potassium, rubidium or cesium and the phenyl ester of halobenzoic acid will result regardless of the choice of alkali metal. For the reaction to proceed as desired, each of the two reactants in the starting mixture must have chlorine or bromine at the ortho position. The temperature for carrying out the reaction is in the range of 250–375° C. and more preferably 300–340° C. Xanthone is also formed as a minor product of the reaction.

In another aspect of the invention the reaction described above is first carried out to form the phenyl ester of either o-chlorobenzoic acid or o-bromobenzoic acid. The ester is then subjected to hydrolysis and phenol is separated from the reaction mixture as a desired product of the process. Xanthone can also be obtained as a side product in minor amount. The procedure results in the regeneration from the phenyl ester of a considerable proportion of either the o-halobenzoic acid or its alkali metal salt which can be recycled to the first step of the process.

The principal reactions involved in the process can be depicted by the following equations, assuming that the alkali metal is potassium and the halogen is bromine:

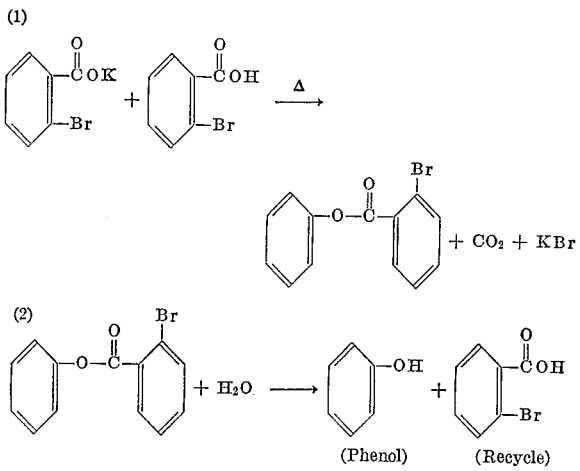

Considering Equation 1, it can be seen that the pyrolysis at 250–375° C. of a mixture consisting of potassium o-bromobenzoate together with the free acid corresponding to this salt causes the release of carbon dioxide and potassium bromide and results in formation of the phenyl ester of o-bromobenzoic acid. This pyrolysis step preferably is carried out at about atmospheric pressure and in a manner to exclude air and moisture from the reaction mixture while permitting escape of the released carbon dioxide. For obtaining the ester in substantial yield, stoichiometric proportions of the reactants as indicated by the equation need not be used; and in fact the molar ratio of acid to salt can vary widely, for example, from 1:5 to 10:1. It is preferable, however, to use an acid to salt ratio substantially in excess of 1:1, for the reason that the salt tends to react with itself on pyrolysis to form xanthone. Hence the use of an excess of the acid over the salt tends to suppress the xanthone reaction and thus increase the conversion of the salt to the desired phenyl ester. The time of heating the reaction mixture will vary depending mainly upon the temperature used but generally will be in the range of 0.1–2.0 hours.

Equation 2 represents a simplification of the hydrolysis step whereby the phenyl o-bromobenzoate is converted in part to phenol, which can be removed as a desired product of the process, and in part to o-bromobenzoic acid which can be recycled to the first step. Various procedures can be utilized to effect these results and they generally involve several steps rather than a single step as might seem to be indicated by Equation 2. One suitable procedure for hydrolyzing the phenyl ester and working up the reaction product is described below.

The product mixture from the reaction depicted by Equation 1 generally contains, in addition to the phenyl ester and potassium bromide, some amounts of unreacted salt and acid as well as xanthone resulting from the reaction of the salt with itself and also acid anhydride. One suitable procedure for processing this mixture involves mixing and heating it at a temperature of 60–100° C. with an aqueous solution of strong alkali (e.g. NaOH) which has a pH above 11. Initially the phenyl ester and xanthone will form a phase separate from the aqueous phase which contains the KBr. As the heating is continued, the ester will hydrolyze and sodium phenolate and sodium o-bromobenzoate will be formed. Each of the latter will dissolve in the aqueous phase, while the xanthone will remain undissolved. When the hydrolysis is complete, which may require several hours, the heating is discontinued and the mixture is allowed to separate into layers. The xanthone layer then can be separated from the aqueous layer. If desired, the aqueous layer can be extracted with a suitable solvent such as benzene or toluene to insure removal of the xanthone.

The aqueous layer from which the xanthone has been separated is next treated with a suitable amount of mineral acid such that it remains only slightly alkaline (e.g. pH=8). This releases the phenol but leaves the sodium o-bromobenzoate unconverted. The mixture is steam distilled to remove the phenol and the residue is then strongly acidified. This converts the sodium o-bromobenzoate to the corresponding acid which is substantially insoluble in water and accordingly precipitates. The recovered o-bromobenzoic acid can then be dried and recycled to the first step of the process. This procedure also effects recovery of any of the starting materials which did not react during the pyrolysis step.

The following examples are illustrative of the invention:

Example 1

A mixture of o-bromobenzoic acid (3.124 g.) and potassium o-bromobenzoate (2.411 g.) was prepared such that the molar ratio of acid to salt was about 3:2. The mixture was placed in a glass tube which had been purged with nitrogen and the tube was heated while the nitrogen purge was continued. The maximum temperature that the reaction mixture reached during heating was 335° C. and the total time above 300° C. was 9 minutes. The pyrolysis product was dissolved in 200 ml. of ethyl ether, and the solution was first filtered to remove KBr and then washed with a 5% aqueous solution of $NaHCO_3$ to remove unreacted o-bromobenzoic acid. Ether was evaporated from the solution, the residue was dissolved in petroleum ether and the resulting solution was passed through a chromatographic column containing alumina. A fraction of effluent obtained from the column was found upon evaporation of the petroleum ether to contain 1.036 g. of a clear oil which had the infrared spectrum of an ester. Hydrolysis of this ester produced phenol and o-bromobenzoic acid, showing that the ester was phenyl o-bromobenzoate. The yield of ester in this fraction, based on the maximum theoretical yield obtainable from the quantity of potassium o-bromobenzoate used, was about 37%. Other fractions of effluent obtained from the column were shown to contain mixtures of this ester and xanthone.

*Example II*

13.97 g. of o-bromobenzoic acid and 2.38 g. of potassium o-bromobenzoate (molar ratio of acid to salt=7:1) were heated in similar manner as above, but in this case the maximum temperature reached was 315° C. and the time above 300° C. was 16 minutes. Upon working up the product similarly as in the preceding example, a chromatographic fraction constituting 1.276 g. of phenyl o-bromobenzoate was obtained. This amounted to a 46% yield based on the potassium o-bromobenzoate used.

When chlorine is substituted for bromine as the halogen in the starting materials, results analogous to those shown in the preceding examples are obtained. The same is true when sodium, rubidium and cesium are substituted as the alkali metal of the o-halobenzoate salt.

The xanthone obtained as by-product of the present process is useful in the preparation of perfumes, pharmaceuticals, larvacides and dyes.

I claim:

1. Method of preparing phenol which comprises heating an alkali metal salt of an o-halobenzoic acid, wherein the alkali metal is selected from the group consisting of sodium, potassium, rubidium and cesium and the halogen is selected from the group consisting of chlorine and bromine, to a temperature in the range of 250-375° C. in the presence of a reactant amount of an o-halobenzoic acid in which the halogen is selected from the group consisting of chlorine and bromine, whereby a phenyl o-halobenzoate is formed, hydrolyzing said phenyl o-halobenzoate and separating phenol from the hydrolysis product.

2. Method according to claim 1 wherein said temperature is in the range of 300-340° C.

3. Method according to claim 1 wherein said alkali metal is potassium.

4. Method according to claim 1 wherein the halogen in said salt and in the o-halobenzoic acid each is bromine.

5. Method according to claim 1 wherein the halogen in said salt and in the o-halobenzoic acid each is chlorine.

6. Method according to claim 1 wherein said salt is potassium o-bromobenzoate, said acid is o-bromobenzoic acid and said temperature is in the range of 300-340° C.

7. Method of preparing a phenyl o-halobenzoate ester which comprises heating an alkali metal salt of an o-halobenzoic acid, wherein the alkali metal is selected from the group consisting of sodium, potassium, rubidium and cesium and the halogen is selected from the group consisting of chlorine and bromine, to a temperature in the range of 250-375° C. in the presence of a reactant amount of an o-halobenzoic acid in which the halogen is selected from the group consisting of chlorine and bromine.

8. Method according to claim 7 wherein said temperature is in the range of 300-340° C.

9. Method according to claim 7 wherein said alkali metal is potassium.

10. Method according to claim 7 wherein the halogen in said salt and in the o-halobenzoic acid each is bromine.

11. Method according to claim 7 wherein the halogen in said salt and in the o-halobenzoic acid each is chlorine.

12. Method of making phenyl o-bromobenzoate which comprises heating potassium o-bromobenzoate and o-bromobenzoic acid to a temperature in the range of 300-340° C.

References Cited in the file of this patent

UNITED STATES PATENTS 2,762,838     Toland     Sept. 11, 1956
3,078,299     McNelis     Feb. 19, 1963

OTHER REFERENCES

Hurd: The Pyrolsis of Carbon Compounds (New York, 1929), pp. 444-5, 540-5.

Hickinbottom: Reactions of Organic Compounds (London, 1948), pp. 415-6, 231-2.

Burger: Medicinal Chemistry (New York, 1960), p. 75.